United States Patent
Evans

(10) Patent No.: US 12,307,529 B1
(45) Date of Patent: May 20, 2025

(54) SENSOR DATA INTEGRATION AND ANALYSIS

(71) Applicant: Palantir Technologies Inc., Palo Alto, CA (US)

(72) Inventor: James Evans, Staten Island, NY (US)

(73) Assignee: Palantir Technologies Inc., Denver, CO (US)

( * ) Notice: Subject to any disclaimer, the term of this patent is extended or adjusted under 35 U.S.C. 154(b) by 149 days.

(21) Appl. No.: 16/274,883

(22) Filed: Feb. 13, 2019

Related U.S. Application Data

(60) Provisional application No. 62/778,490, filed on Dec. 12, 2018.

(51) Int. Cl.
*G06Q 40/08* (2012.01)
*G06F 16/9035* (2019.01)

(52) U.S. Cl.
CPC ......... *G06Q 40/08* (2013.01); *G06F 16/9035* (2019.01)

(58) Field of Classification Search
CPC ................. G06Q 10/0635; G06F 16/9035
USPC ................. 701/31.4; 705/4; 73/579
See application file for complete search history.

(56) References Cited

U.S. PATENT DOCUMENTS

| | | | | |
|---|---|---|---|---|
| 6,885,309 | B1 * | 4/2005 | Van Heteren | G08C 15/06 340/870.11 |
| 8,370,362 | B2 | 2/2013 | Szabo | |
| 8,560,366 | B2 | 10/2013 | Mikurak | |
| 9,197,628 | B1 * | 11/2015 | Hastings | H04L 63/166 |
| 9,344,683 | B1 * | 5/2016 | Nemat-Nasser | G01S 19/17 |
| 9,678,559 | B1 * | 6/2017 | Devries | G06F 3/16 |
| 10,115,164 | B1 * | 10/2018 | Binion | B60W 50/14 |
| 10,269,076 | B1 * | 4/2019 | Ton-That | G06Q 40/08 |
| 10,308,256 | B1 * | 6/2019 | Chan | B60W 30/08 |
| 10,703,378 | B1 * | 7/2020 | Russo | G06F 16/29 |
| 10,817,530 | B2 | 10/2020 | Siebel et al. | |
| 2002/0111725 | A1 * | 8/2002 | Burge | G06Q 40/08 701/31.4 |
| 2007/0256499 | A1 * | 11/2007 | Pelecanos | G01H 1/00 73/579 |
| 2008/0215609 | A1 * | 9/2008 | Cleveland | G06F 16/24556 707/999.102 |
| 2009/0054079 | A1 * | 2/2009 | Dubinsky | G06Q 20/105 455/556.1 |
| 2010/0063850 | A1 * | 3/2010 | Daniel | G06Q 40/025 705/4 |

(Continued)

FOREIGN PATENT DOCUMENTS

JP 6473689 B2 * 2/2019 ............. H04B 7/185
KR 1433307 B1 * 8/2014

*Primary Examiner* — Christine M Behncke
*Assistant Examiner* — Henry H Jung
(74) *Attorney, Agent, or Firm* — Knobbe, Martens, Olson & Bear, LLP

(57) ABSTRACT

An asset owner may be interested in determining risks associated with physical assets, such as to damage or other loss associated with the assets. Accurately identifying such risks may be useful in determining preventative actions that may be taken to reduce data or loss associated with the assets. The systems and methods described herein generally relate to automating a process of obtaining data regarding physical assets, such as from sensors associated with the assets, determining one or more risk indicators associated with the assets, and initiating some actions based on the determined risk indicators.

22 Claims, 6 Drawing Sheets

(56) References Cited

U.S. PATENT DOCUMENTS

| | | | |
|---|---|---|---|
| 2015/0046197 A1* | 2/2015 | Peng | B60W 40/09 |
| | | | 701/31.5 |
| 2015/0244598 A1* | 8/2015 | Puhlmann | H04Q 9/00 |
| | | | 709/224 |
| 2016/0030279 A1* | 2/2016 | Driscoll | A61H 19/40 |
| | | | 601/46 |
| 2016/0121151 A1* | 5/2016 | Schmitt | A62C 35/60 |
| | | | 169/61 |
| 2018/0047074 A1* | 2/2018 | Cronin | G06Q 10/00 |
| 2018/0100762 A1* | 4/2018 | Park | G01J 1/0219 |
| 2018/0188715 A1* | 7/2018 | Cella | H04W 84/18 |
| 2018/0270548 A1* | 9/2018 | Richter | H04Q 9/00 |
| 2018/0295535 A1* | 10/2018 | Kavars | G06F 1/28 |
| 2019/0050942 A1* | 2/2019 | Dalal | G06Q 50/163 |
| 2019/0283247 A1* | 9/2019 | Chang | A61B 5/1121 |
| 2019/0364398 A1* | 11/2019 | Castonzo | H04W 4/029 |
| 2020/0067789 A1 | 2/2020 | Khuti et al. | |
| 2020/0104876 A1* | 4/2020 | Chintakindi | G06F 21/31 |
| 2020/0167437 A1* | 5/2020 | Mallya Kasaragod | |
| | | | G06F 30/20 |
| 2020/0412767 A1 | 12/2020 | Crabtree et al. | |
| 2021/0248693 A1 | 8/2021 | Riland et al. | |

* cited by examiner

SENSOR DATA INTEGRATION AND ANALYSIS

TECHNICAL FIELD

The present disclosure relates to systems and techniques for data integration, analysis, and visualization. More specifically, integration of sensors data associated with multiple assets.

BACKGROUND

Asset owners (e.g., businesses, individuals, or other entities) have an interest in evaluating risk of malfunction, mis-operation, damage and/or complete loss of assets, where an asset may include any object of value, such as an automobile, airplane, boat, airport, hospital, factory, machinery, person, computer, phone, etc.

SUMMARY

An asset owner may be interested in determining risks associated with physical assets, such as to damage or other loss associated with the assets. Accurately identifying such risks may be useful in determining preventative actions that may be taken to reduce damage or loss associated with the assets. The systems and methods described herein generally relate to automating a process of obtaining data regarding physical assets, such as from sensors associated with the assets, determining one or more risk indicators associated with the assets, and initiating some actions based on the determined risk indicators.

In some embodiments, a determined risk indicator associated with an asset may be useful in obtaining insurance by the entity that owns the assets, such as to mitigate risk associated with partial or complete loss of the asset. Thus, rather than determining risk indicators and associated insurance rates based on general information regarding an asset (e.g., based on manual inspection of an asset or general information regarding the age and characteristics of the asset), actual usage data of the asset (e.g., from one or more sensors providing real-time sensor data indicating characteristics of the asset) may be used to determine risk indicators associated with the asset, which could then be used to determine insurance factors that may signify a decreased (or increased) risk associated with the particular asset.

Accordingly, in various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

DETAILED DESCRIPTION

Overview

Figure 1A:
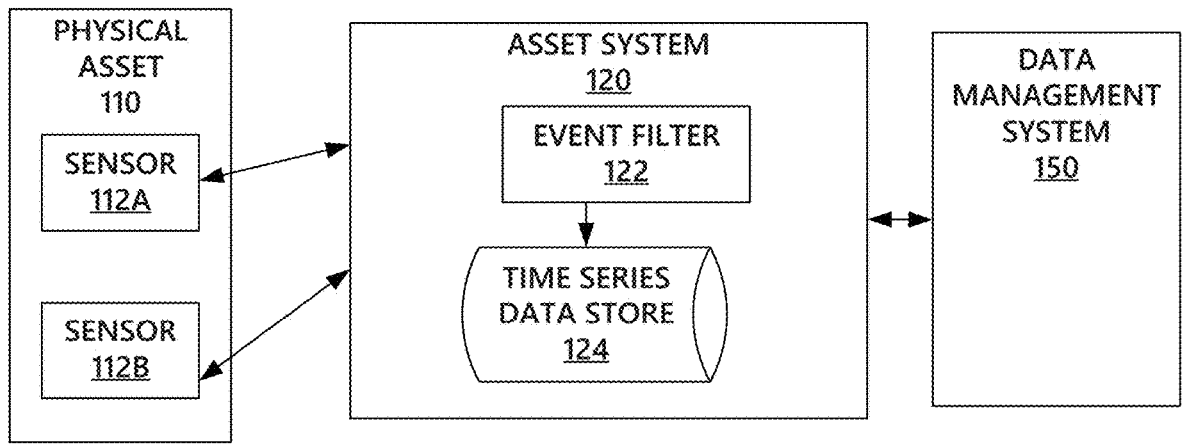
FIG. 1A is a block diagram of an asset server in communication with multiple assets and a data integration server.

An asset tracking system (or "asset system") is configured to communicate with a plurality of sensors associated with assets of interest. The asset system may include modules coupled to networks that receive manual and/or automated feedback from sensors associated with assets. For example, manual feedback may include records that are entered by humans, such as in filling out forms identifying characteristics of a patient during a medical exam, an automobile during a checkup, a building during a structural integrity test, etc. Automated feedback, on the other hand, may comprise real-time timeseries data output from multiple sensors associated with assets. For example, a vehicle (e.g., an automobile, boat, RV, airplane, spacecraft, etc.) may have multiple sensors positioned to sense various attributes of the vehicle, such as location, speed, acceleration, engine temperature, oil pressure, engine RPM, etc. In some embodiments, each sensor registers with the asset system in order to obtain an API token that thereafter allows the sensor to communicate asset data (e.g., one or more sensor outputs from the particular sensor) to the asset system. Thus, the asset system may store, analyze, apply rules and models, etc. to sensor data from each of a plurality of assets and thereafter provide event data (e.g., some small subset of sensor data that matches event rules) to a data management system, such as may be operated by an entity owning or having some other interest in status of the various assets. Further details regarding these and other advantages of the system are described further below.

Terms

In order to facilitate an understanding of the systems and methods discussed herein, a number of terms are described below. The terms described below, as well as other terms used herein, should be construed to include the provided descriptions, the ordinary and customary meaning of the terms, and/or any other implied meaning for the respective terms. Thus, the descriptions below do not limit the meaning of these terms, but only provide exemplary descriptions.

Application Programming Interfaces (APIs): an API is generally a defined communication channel, protocol, settings, etc. that allows two devices to exchange information between one another in a more direct manner than might otherwise be possible. In some embodiments, an API registration module may be configured to register individual devices (e.g. computing devices, Internet of things devices, sensors, etc.) for communication with a particular computing device (e.g., a central server that receives, processes, stores, provides, information to the individual devices) by issuing a token to the individual devices that authorizes such direct communications. Thus, a computing system may establish secure and direct communication channels with multiple devices via APIs.

Ontology: Stored information that provides a data model for storage of data in one or more databases. For example, the stored data may comprise definitions for object types and property types for data in a database, and how objects and properties may be related.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle® databases, PostgreSQL® databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Data Object or Object: A data container for information representing specific things in the world that have a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: Type of a data object (e.g., person, object type, event, or document). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Properties: Attributes of a data object that represent individual data items. At a minimum, each property of a data object has a property type and a value or values.

Property Type: The type of data a property is, such as a string, an integer, or a double. Property types may include complex property types, such as a series data values associated with timed ticks (e.g. a time series), etc.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Overview of Example Asset Tracking System

FIG. 1A is a block diagram of an asset system 120 in communication with multiple assets 110 and a data management system 150. In this example, the asset tracking system (or "asset system") 120 is configured to communicate with a plurality of sensors 112 (including sensors 112A-112N) associated with assets 110 of interest, such as physical assets. The asset system 120 may include modules coupled to networks that receive manual and/or automated feedback from sensors associated with multiple physical assets (e.g., assets 110A, 110B, and 110C in the example of FIG. 3).

For example, manual feedback may include records that are entered by humans, such as in filling out forms identifying characteristics of a patient during a medical exam, an automobile during a checkup, a building during a structural integrity test, etc. Automated feedback, on the other hand, may comprise real-time timeseries data output from multiple sensors associated with assets. For example, a vehicle may have multiple sensors positioned to sense various attributes of the automobile, such as location, speed, acceleration, engine temperature, oil pressure, engine RPM, etc.

An asset system 120 may include one or more network devices that are separated by a firewall from a data management system 150 of an organization, such as a system that maintains ontological data structures that indicate relationships between various objects (e.g., including assets for which sensor data is received). The data management systems, such as system 150, may be used by organizations to integrate, analyze, manage, and collaborate around data associated with the organization, while protecting access to the data using security mechanisms such as firewalls. Thus, for each input to the data management system 150, access through a firewall (and/or other security measures) may be required, which could become cumbersome when the number of access ports through the firewall expands (e.g., to accommodate sensor data from hundreds, thousands, or more sensors). Thus, in certain embodiments discussed herein, the asset system 120 provides an interface between the data management system 150 and the plurality of sensors 112A and 112B, including, in some implementations, a single firewall access port through which timeseries data from the plurality of sensors may be provided to the data management system 150.

In the example embodiment of FIG. 1A, the asset system 120 is configured to generate, store and/or use an API token (also referred to as an API key) for each sensor, which is usable by the sensor to communicate directly with the asset system 120. As discussed further below with reference to FIG. 3, API tokens may be generated and distributed by various devices and in various manners. For example, in one embodiment API tokens are generated by the data management system 150 and then provided to the asset system 120 to register the API tokens as valid tokens. Once the API tokens are registered with the asset system 120, the asset system 120 may then provide these API tokens with the corresponding physical assets. In another example embodiment, the asset system 120 generates the API tokens, stores the API tokens, and provides them to the corresponding physical assets. In other embodiments, other devices and/or components may perform portions of the API generation, storage, and/or provisioning of the API tokens.

Thus, the asset system 120 may receive real-time sensor data through the use of the API. The API keys may be stored in an API registry and associated with parameters of the corresponding sensors, such as event settings (discussed below). In this way, when time series data is received via an API (e.g., with an API token), the asset system 120 can determine the corresponding event settings and apply them to quickly provide a filtered data stream, such as to the data management system 150.

The asset system 120 may include event settings configured to filter timeseries data from sensors to identify the sensor data of interest to a user of the data management system, such as a risk manager that is determining risk associated with a physical asset based on time series data from one or more sensors associated with the physical asset. Event settings made include rules, criteria, thresholds, filter settings, etc. that are applied to time series data from sensors to reduce the volume of sensor data provided to the data integration system. The asset system may include event settings that are particular to types of sensors, as well as event settings that are customized for individual, or groups of, sensors. Thus, the user can greatly customize the types, characteristics, and volume of sensor data passed along to the data integration system. In the embodiment of FIG. 1A, the asset system 120 includes an event filter 122 configured to apply the event settings to data from particular sensors 112. The event filter 122 may they initiate storage of certain or all of the events in a timeseries data store 124, and then also provide only those sensor outputs (e.g., timeseries data from sensors) and/or summarization of sensor outputs that match a filter to the data management system 150.

The time series data may be analyzed to identify relationships between various sensor data, such as how increases in a particular sensor output over a certain time period occurs just prior to (and maybe indicates some association between) a decrease in sensor output of another sensor associated with the asset. Thus, the asset system 120 may provide a real-time view of status of assets that is based on current sensor outputs associated with the assets and, accordingly, when a risk level exceeds a threshold an alert may be transmitted to one or more entities that may take actions to reduce ongoing and/or additional damage.

In some embodiments, the asset system may further include risk scoring and/or insurance estimation models that are applied to data received from manual and/or automated feedback channels associated with assets. For example, the asset system 120 may include an insurance estimation model that provides an indication of how risk associated with a particular asset compares to similar assets (e.g., much lower risk, lower risk, comparable risk, higher risk, much higher risk, etc.), which may then be used to determine insurance costs for the asset.

For purposes of illustration, below are a few event triggers that could be provided by the asset system 120 and/or data management system, based on sensor data from multiple sensors associated with an asset.

- Risk of damage to a fleet vehicle based on sensor data associated with a pacemaker (and/or other medical devices) of a vehicle driver, location of the vehicle, speed of the vehicle, acceleration of the vehicle, and/or route taken by the driver.
- Risk of bursting pipes at a facility where temperature sensors and forecast data is combined to determine risk of pipe breakage based on cold temperatures.
- Risk of a rogue employee based on sensor data from the employee's smart phone (e.g., location, communications, etc.), work badge (e.g., location, resources accessed, etc.), and computer (e.g., activity data).
- Risk of damage to a vehicle and/or driving instructions (e.g., limits on speed of a vehicle) based on sensor data from GPS, accelerometer, tier pressure, entertainment system status, bluetooth call data, etc., as well as possibly third party data regarding road conditions, weather, etc.

Example Data Management System

Figure 1B:
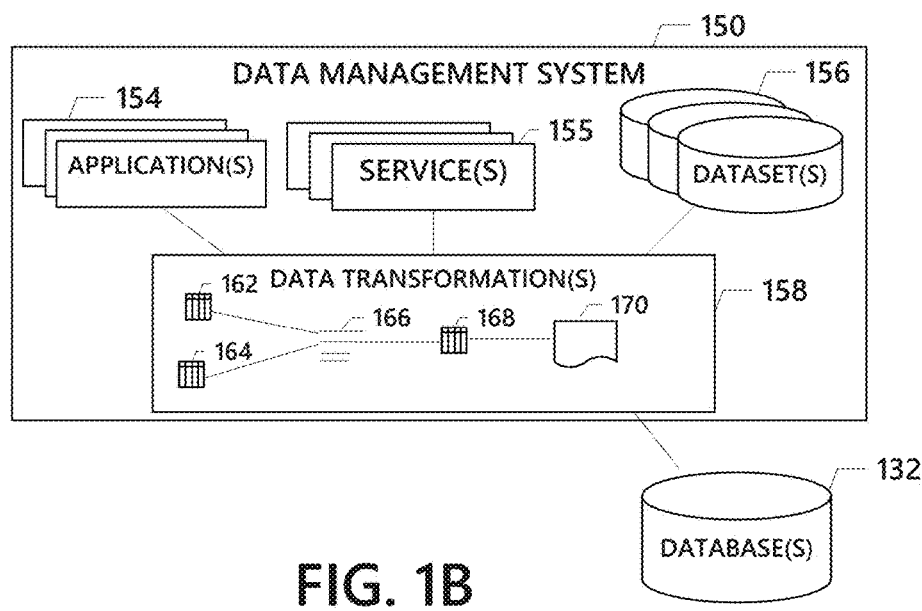
FIG. 1B is a block diagram illustrating an example data management system, such as may be used to receive asset data via the asset system.

FIG. 1B illustrates an example data management system 150, such as may be used to receive asset data via the asset system 120. The example data management system 150 includes one or more applications 154, one or more services 155, one or more initial datasets 156, and a data transformation process 158 (also referred to herein as a build process). The example data management system 150 can include a data pipeline system. The data management system 150 can transform data and record the data transformations. The one or more applications 154 can include applications that enable users to view datasets, interact with datasets, filter data sets, and/or configure dataset transformation processes or builds. The one or more services 155 can include services that can trigger the data transformation builds and API services for receiving and transmitting data. The one or more initial datasets 156 can be automatically retrieved from external sources and/or can be manually imported by a user. For example, the initial data sets 156 may include event data received from the asset system 120. The one or more initial datasets 156 can be in many different formats such as a tabular data format (SQL, delimited, or a spreadsheet data format), a data log format (such as network logs), or time series data (such as sensor data).

The data management system 150, via the one or more services 155, can apply the data transformation process 158. An example data transformation process 158 is shown. The data management system 150 can receive one or more initial datasets 162, 164. The data management system 150 can apply a transformation to the dataset(s). For example, the data management system 150 can apply a first transformation 166 to the initial datasets 162, 164, which can include joining the initial datasets 162, 164 (such as or similar to a SQL JOIN), and/or a filtering of the initial datasets 162, 164. The output of the first transformation 166 can include a modified dataset 168. A second transformation of the modified dataset 168 can result in an output dataset 170, such as a report or a joined table in a tabular data format that can be stored in the database 132. Each of the steps in the example data transformation process 158 can be recorded by the data management system 150 and made available as a resource to users of the data management system 150. For example, a resource can include a dataset and/or a dataset item, a transformation, or any other step in a data transformation process. As mentioned above, the data transformation process or build 158 can be triggered by the data management system 150, where example triggers can include nightly build processes, detected events, or manual triggers by a user. Additional aspects of data transformations and the data management system 150 are described in further detail below.

The techniques for recording and transforming data in the data management system 150 may include maintaining an immutable history of data recording and transformation actions such as uploading a new dataset version to the data management system 150 and transforming one dataset version to another dataset version. The immutable history is referred to herein as "the catalog." The catalog may be stored in a database. Preferably, reads and writes from and to the catalog are performed in the context of ACID-compliant transactions supported by a database management system. For example, the catalog may be stored in a relational database managed by a relational database management system that supports atomic, consistent, isolated, and durable (ACID) transactions.

The catalog can include versioned immutable "datasets." More specifically, a dataset may encompass an ordered set of conceptual dataset items. The dataset items may be ordered according to their version identifiers recorded in the catalog. Thus, a dataset item may correspond to a particular version of the dataset. A dataset item may represent a snapshot of the dataset at a particular version of the dataset. As a simple example, a version identifier of '1' may be recorded in the catalog for an initial dataset item of a dataset. If data is later added to the dataset, a version identifier of '2' may be recorded in the catalog for a second dataset item that conceptually includes the data of the initial dataset item and the added data. In this example, dataset item '2' may represent the current dataset version and is ordered after dataset item '1'.

As well as being versioned, a dataset may be immutable. That is, when a new version of the dataset corresponding to a new dataset item is created for the dataset in the system, pre-existing dataset items of the dataset are not overwritten by the new dataset item. In this way, pre-existing dataset items (i.e., pre-existing versions of the dataset) are preserved when a new dataset item is added to the dataset (i.e., when a new version of the dataset is created). Note that supporting immutable datasets is not inconsistent with pruning or deleting dataset items corresponding to old dataset versions. For example, old dataset items may be deleted from the system to conserve data storage space.

A version of dataset may correspond to a successfully committed transaction against the dataset. In these embodiments, a sequence of successfully committed transactions against the dataset corresponds to a sequence of dataset versions of the dataset (i.e., a sequence of dataset items of the dataset).

A transaction against a dataset may add data to the dataset, edit existing data in the dataset, remove existing data from the dataset, or a combination of adding, editing, or removing data. A transaction against a dataset may create a new version of the dataset (i.e., a new dataset item of the dataset) without deleting, removing, or modifying pre-existing dataset items (i.e., without deleting, removing, or modifying pre-existing dataset versions). A successfully committed transaction may correspond to a set of one or more files that contain the data of the dataset item created by the successful transaction. The set of files may be stored in a file system.

In the catalog, a dataset item of a dataset may be identified by the name or identifier of the dataset and the dataset version corresponding to the dataset item. In some embodiments, the dataset version corresponds to an identifier assigned to the transaction that created the dataset version. The dataset item may be associated in the catalog with the set of files that contain the data of the dataset item. In some embodiments, the catalog treats the set of files as opaque. That is, the catalog itself may store paths or other identifiers of the set of files but may not otherwise open, read, or write to the files.

In sum, the catalog may store information about datasets. The information may include information identifying different versions (i.e., different dataset items) of the datasets. In association with information identifying a particular version (i.e., a particular dataset item) of a dataset, there may be information identifying one or more files that contain the data of the particular dataset version (i.e., the particular dataset item).

The catalog may store information representing a non-linear history of a dataset. Specifically, the history of a dataset may have different dataset branches. Branching may be used to allow one set of changes to a dataset to be made independent and concurrently of another set of changes to the dataset. The catalog may store branch names in association with dataset version identifiers for identifying dataset items that belong to a particular dataset branch.

The catalog may provide dataset provenance at the transaction level of granularity. As an example, suppose a transformation is executed in the data management system 150 multiple times that reads data from dataset A, reads data from dataset B, transforms the data from dataset A and the data from dataset B in some way to produce dataset C. As mentioned, this transformation may be performed multiple times. Each transformation may be performed in the context of a transaction. For example, the transformation may be performed daily after datasets and B are updated daily in the context of transactions. The result being multiple versions of dataset A, multiple versions of dataset B, and multiple versions of dataset C as a result of multiple executions of the transformation. The catalog may contain sufficient information to trace the provenance of any version of dataset C to the versions of datasets A and B from which the version of dataset C is derived. In addition, the catalog may contain sufficient information the trace the provenance of those versions of datasets A and B to the earlier versions of datasets A and B from which those versions of datasets A and B were derived.

The provenance tracking ability is the result of recording in the catalog for a transaction that creates a new dataset version, the transaction or transactions that the given transaction depends on (e.g., is derived from). The information recorded in the catalog may include an identifier of each dependent transaction and a branch name of the dataset that the dependent transaction was committed against.

According to some embodiments, provenance tracking extends beyond transaction level granularity to column level granularity. For example, suppose a dataset version A is structured as a table of two columns and a dataset version B is structured as a table of five columns. Further assume, column three of dataset version B is computed from column one of dataset version A. In this case, the catalog may store information reflecting the dependency of column three of dataset version B on column one of dataset version A.

The catalog may also support the notion of permission transitivity. For example, suppose the catalog records information for two transactions executed against a dataset referred to in this example as "Transaction 1" and Transaction 2." Further suppose a third transaction is performed against the dataset which is referred to in this example as "Transaction 3." Transaction 3 may use data created by Transaction 1 and data created by Transaction 2 to create the dataset item of Transaction 3. After Transaction 3 is executed, it may be decided according to organizational policy that a particular user should not be allowed to access the data created by Transaction 2. In this case, as a result of the provenance tracking ability, and in particular because the catalog records the dependency of Transaction 3 on Transaction 2, if permission to access the data of Transaction 2 is revoked from the particular user, permission to access the data of Transaction 3 may be transitively revoked from the particular user.

The transitive effect of permission revocation (or permission grant) can apply to an arbitrary number of levels in the provenance tracking. For example, returning to the above example, permission may be transitively revoked for any transaction that depends directly or indirectly on the Transaction 3.

According to some embodiments, where provenance tracking in the catalog has column level granularity. Then permission transitivity may apply at the more fine-grained column level. In this case, permission may be revoked (or granted) on a particular column of a dataset and based on the column-level provenance tracking in the catalog, permission may be transitively revoked on all direct or indirect descendent columns of that column.

A build service can manage transformations which are executed in the system to transform data. The build service may leverage a directed acyclic graph data (DAG) structure to ensure that transformations are executed in proper dependency order. The graph can include a node representing an output dataset to be computed based on one or more input datasets each represented by a node in the graph with a directed edge between node(s) representing the input dataset (s) and the node representing the output dataset. The build service traverses the DAG in dataset dependency order so that the most upstream dependent datasets are computed first. The build service traverses the DAG from the most upstream dependent datasets toward the node representing the output dataset rebuilding datasets as necessary so that they are up-to-date. Finally, the target output dataset is built once all of the dependent datasets are up-to-date.

The data management system 150 can support branching for both data and code. Build branches allow the same transformation code to be executed on multiple branches. For example, transformation code on the master branch can be executed to produce a dataset on the master branch or on another branch (e.g., the develop branch). Build branches also allow transformation code on a branch to be executed to produce datasets on that branch. For example, transformation code on a development branch can be executed to produce a dataset that is available only on the development branch. Build branches provide isolation of re-computation of graph data across different users and across different execution schedules of a data pipeline. To support branching, the catalog may store information represents a graph of dependencies as opposed to a linear dependency sequence.

The data management system 150 may enable other data transformation systems to perform transformations. For example, suppose the system stores two "raw" datasets R1 and R2 that are both updated daily (e.g., with daily web log data for two web services). Each update creates a new version of the dataset and corresponds to a different transaction. The datasets are deemed raw in the sense that transformation code may not be executed by the data management system 150 to produce the datasets. Further suppose there is a transformation A that computes a join between datasets R1 and R2. The join may be performed in a data transformation system such a SQL database system, for example. More generally, the techniques described herein are agnostic to the particular data transformation engine that is used. The data to be transformed and the transformation code to transform the data can be provided to the engine based on information stored in the catalog including where to store the output data.

According to some embodiments, the build service supports a push build. In a push build, rebuilds of all datasets that depend on an upstream dataset or an upstream transformation that has been updated are automatically determined based on information in the catalog and rebuilt. In this case, the build service may accept a target dataset or a target transformation as an input parameter to a push build command. The build service than determines all downstream datasets that need to be rebuilt, if any.

As an example, if the build service receives a push build command with dataset R1 as the target, then the build service would determine all downstream datasets that are not up-to-date with respect to dataset R1 and rebuild them. For example, if dataset D1 is out-of-date with respect to dataset R1, then dataset D1 is rebuilt based on the current versions of datasets R1 and R2 and the current version of transformation A. If dataset D1 is rebuilt because it is out-of-date, then dataset D2 will be rebuilt based on the up-to-date version of dataset D1 and the current version of transformation B and so on until all downstream dataset of the target dataset are rebuilt. The build service may perform similar rebuilding if the target of the push build command is a transformation.

The build service may also support triggers. In this case, a push build may be considered a special case of a trigger. A trigger, generally, is a rebuild action that is performed by the build service that is triggered by the creation of a new version of a dataset or a new version of a transformation in the system.

A schema metadata service can store schema information about files that correspond to transactions reflected in the catalog. An identifier of a given file identified in the catalog may be passed to the schema metadata service and the schema metadata service may return schema information for the file. The schema information may encompass data schema related information such as whether the data in the file is structured as a table, the names of the columns of the table, the data types of the columns, user descriptions of the columns, etc.

The schema information can be accessible via the schema metadata service may versioned separately from the data itself in the catalog. This allows the schemas to be updated separately from datasets and those updates to be tracked separately. For example, suppose a comma separated file is uploaded to the system as particular dataset version. The catalog may store in association with the particular dataset version identifiers of one or more files in which the CSV data is stored. The catalog may also store in association with each of those one or more file identifiers, schema information describing the format and type of data stored in the corresponding file. The schema information for a file may be retrievable via the scheme metadata service given an identifier of the file as input. Note that this versioning scheme in the catalog allows new schema information for a file to be associated with the file and accessible via the schema metadata service. For example, suppose after storing initial schema information for a file in which the CSV data is stored, updated the schema information is stored that reflects a new or better understanding of the CSV data stored in the file. The updated schema information may be retrieved from the schema metadata service for the file without having to create a new version of the CSV data or the file in which the CSV data is stored.

When a transformation is executed, the build service may encapsulate the complexities of the separate versioning of datasets and schema information. For example, suppose transformation A described above in a previous example that accepts the dataset R1 and dataset R2 as input is the target of a build command issued to the build service. In response to this build command, the build service may determine from the catalog the file or files in which the data of the current versions of datasets R1 and R2 is stored. The build service may then access the schema metadata service to obtain the current versions of the schema information for the file or files. The build service may then provide all of identifiers or paths to the file or files and the obtained schema information to the data transformation engine to execute the transformation A. The underlying data transformation engine interprets the schema information and applies it to the data in the file or files when executing the transformation A.

Object-Centric Data Model

Figure 2:
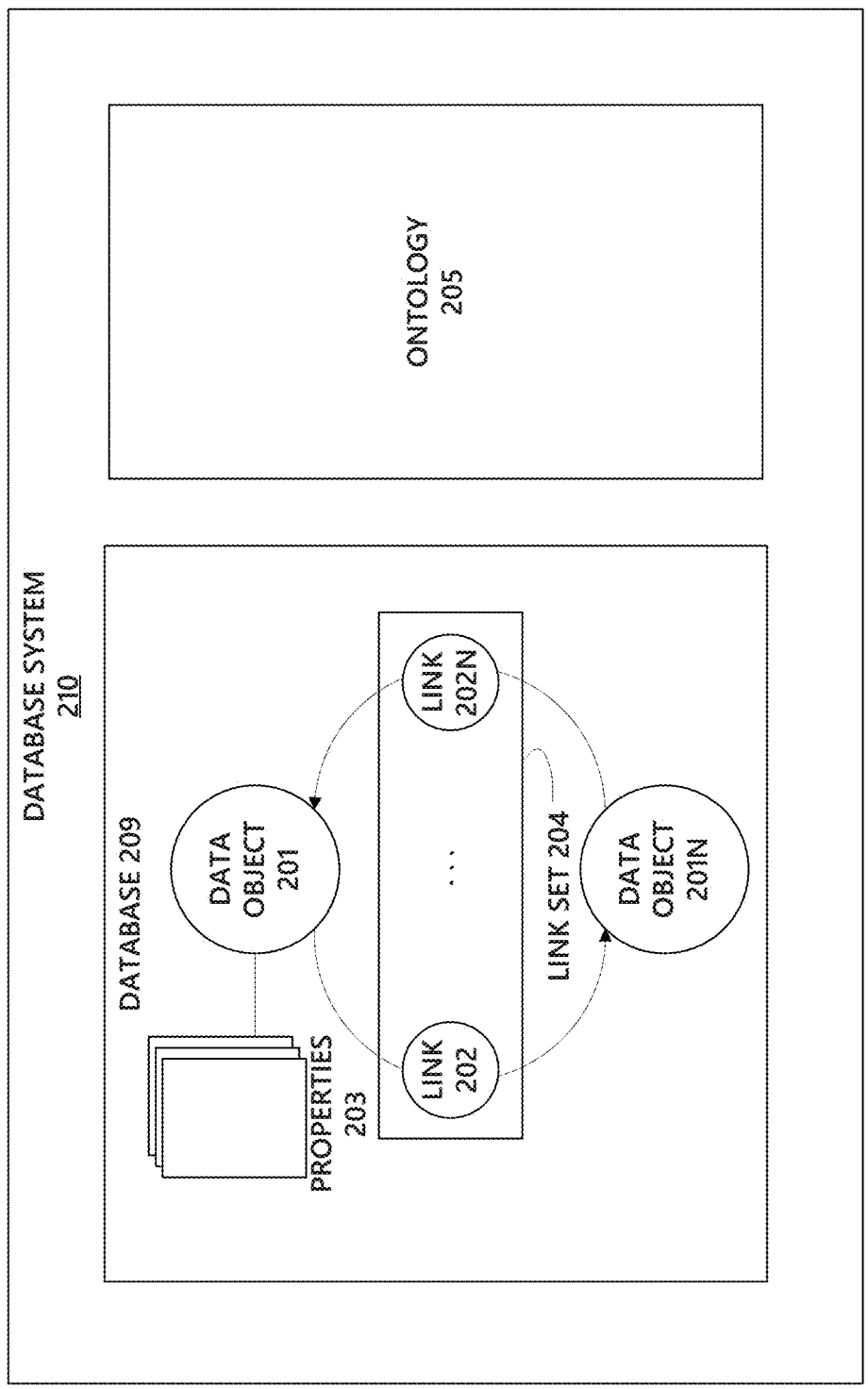
FIG. 2 is a block diagram illustrating one embodiment of a database system using an ontology.

In some embodiments, the data sets 156 of the data management system 150 may be stored according to a particular ontology. FIG. 2 is block diagram illustrating one example of a database system 210, which may also be used as database 132 and/or data sets 156 of FIG. 1B, that makes use of an ontology 205. This description is provided for the purpose of providing an example and is not intended to limit the techniques to the example data model, the example database system, or the example database system's use of an ontology to represent information. For example, an ontology may store information regarding a plurality of assets (each as an object) with properties indicating sensor data from one or more sensors associated with the asset.

In one embodiment, a body of data is conceptually structured according to an object-centric data model represented by ontology 205. The conceptual data model is independent of any particular database used for durably storing one or more database(s) 209 based on the ontology 205. For example, each object of the conceptual data model may correspond to one or more rows in a relational database or an entry in Lightweight Directory Access Protocol (LDAP) database, or any combination of one or more databases.

FIG. 2 illustrates an object-centric conceptual data model according to an embodiment. An ontology 205, as noted above, may include stored information providing a data model for storage of data in the database 209. The ontology 205 may be defined by one or more object types, which may each be associated with one or more property types. At the highest level of abstraction, data object 201 is a container for information representing things in the world. For example, data object 201 can represent an entity such as a person, a place, an organization, a market instrument, or other noun. Data object 201 can represent an event that happens at a point in time or for a duration. Data object 201 can represent a document or other unstructured data source such as an e-mail message, a news report, or a written paper or article. Each data object 201 is associated with a unique identifier that uniquely identifies the data object within the database system.

Different types of data objects may have different property types. For example, a "Person" data object might have an "Eye Color" property type and an "Event" data object might have a "Date" property type. Each property 203 as represented by data in the database system 210 may have a property type defined by the ontology 205 used by the database 209.

Objects may be instantiated in the database 209 in accordance with the corresponding object definition for the particular object in the ontology 205. For example, a specific monetary payment (e.g., an object of type "event") of US$30.00 (e.g., a property of type "currency") taking place on Mar. 27, 2009 (e.g., a property of type "date") may be stored in the database 209 as an event object with associated currency and date properties as defined within the ontology 205. The data objects defined in the ontology 205 may support property multiplicity. In particular, a data object 201 may be allowed to have more than one property 203 of the same property type. For example, a "Person" data object might have multiple "Address" properties or multiple "Name" properties.

Each link 202 represents a connection between two data objects 201. In one embodiment, the connection is either through a relationship, an event, or through matching properties. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Airline Flight" data object representing a particular airline flight if they traveled together on that flight, or by a "Meeting" data object representing a particular meeting if they both attended that meeting. In one embodiment, when two data objects are connected by an event, they are also connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely contain similar, if not identical property values. In one embodiment, a link between two data objects may be established based on similar or matching properties (e.g., property types and/or property values) of the data objects. These are just some examples of the types of connections that may be represented by a link and other types of connections may be represented; embodiments are not limited to any particular types of connections between data objects. For example, a document might contain references to two different objects. For example, a document may contain a reference to a payment (one object), and a person (a second object). A link between these two objects may represent a connection between these two entities through their co-occurrence within the same document.

Each data object 201 can have multiple links with another data object 201 to form a link set 204. For example, two "Person" data objects representing a husband and a wife could be linked through a "Spouse Of" relationship, a matching "Address" property, and one or more matching "Event" properties (e.g., a wedding). Each link 202 as represented by data in a database may have a link type defined by the database ontology used by the database.

Example Asset System

Figure 3:
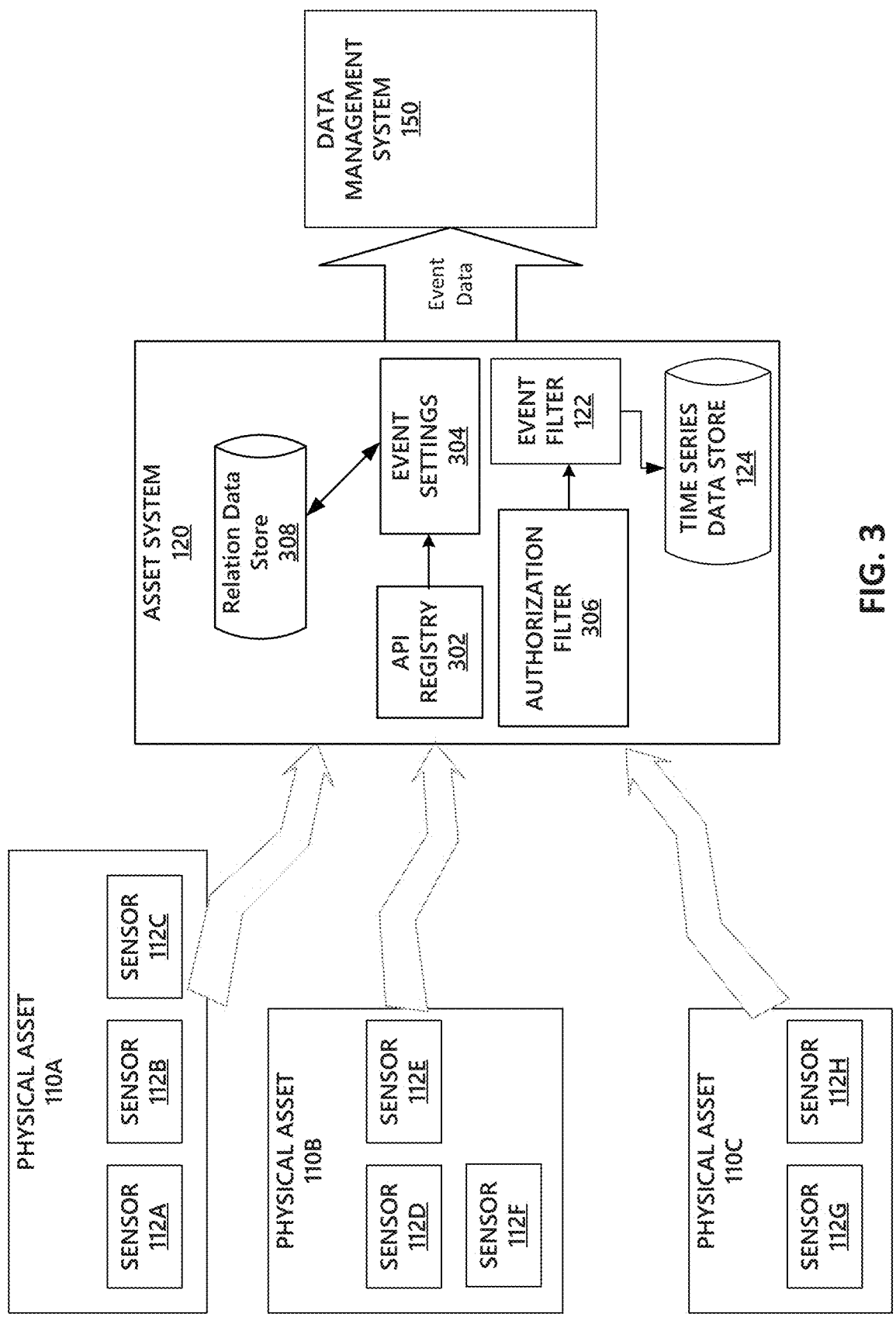
FIG. 3 is a block diagram illustrating an asset system receiving feedback from a plurality of physical assets and providing output to a data management system.

FIG. 3 is a block diagram illustrating an asset system 120 receiving feedback from a plurality of physical assets 110 and providing output to a data management system 150. Advantageously, the asset system 120 provides an intermediary between the multiple sensors of physical assets and the data management system 150, such as via a single connection or channel through a firewall of the data management system 150. For example, rather than having thousands, millions, or more sensor outputs feeding into separate pathways through the firewall (e.g., thousands, millions, or more firewall exceptions), the asset system 120 receives the sensor data from authorized sensors and sends only a filtered subset of the sensor data to the data management system 150, such as through one or very few firewall exceptions, which may greatly increase security of the data management system 150. This configuration further reduces the risk of the data management system 150 receiving potentially harmful data (e.g., viruses or malware) from a compromised sensor from the large group of thousands or millions of sensors.

In the example of FIG. 3, multiple physical assets 100 can each include multiple sensors that provide outputs indicating some condition of the physical asset. In particular, physical asset 110A includes three sensors 112A, 112B, and 112C, while physical asset 110B includes sensors 112D, 112E, and 112F, and physical asset 110C includes sensors 112G and 112H. In other embodiments, additional sensors may be associated with a particular physical asset and/or additional physical assets may provide output data to the asset system 120.

Depending on the embodiment, the physical assets may vary in type, location, output format, etc. For example, in one embodiment the physical asset 110A may be a communication device, such as a cell phone, with one of the sensors 112A being a location sensor associated with the cell phone, while the physical asset 110B may be a computer associated with a user of the cell phone, with sensors 112D-112F being sensors indicating characteristics of the computer, such as operating temperature, CPU load, network usage, etc., and physical asset 110C may be associated with a security device of the user, such as a security card that allows the user to access a particular facility. In other embodiments, the physical assets may include any other object of value, such as an automobile, airplane, boat, airport, hospital, factory, machinery, person, computer, phone, etc., whether the object is stationary, movable, automated, computerized, electronic, mechanical, or otherwise.

In the embodiment of FIG. 3, the physical assets provide sensor data to the asset system 120. In some embodiments, certain of the sensor data is provided via manual feedback, such as via records that are entered by humans by filling out forms identifying characteristics of a patient during a medical exam, a and automobile during a checkup, a building during a structural integrity test, etc. advantageously, however, much of the sensor data associated with the physical assets 110A-110C is provided via automated feedback, which may comprise transmission of real-time timeseries data output from the multiple sensors 112 associated with respective assets 110 to the asset system 120.

For example, an automobile asset (e.g., asset 110A) may have multiple sensors (e.g., sensors 112A-112C) positioned to sense various attributes of the automobile, such as location, speed, acceleration, engine temperature, oil pressure, engine RPM, etc.

In the embodiment of FIG. 3, the asset system 120 includes an API registry 302 configured to register each sensor with the asset system 120, and to provide each sensor with an API token (or key) that thereafter allows the sensor to communicate sensor data (e.g., one or more sensor outputs from the particular sensor) to the asset system 120. Thus, sensor data may be efficiently provided from the various sensors associated with an asset to the asset system 120. In some embodiments, the sensor registration process occurs directly between the particular sensor and the API registry 302, while in other embodiments, a batch registration process of multiple sensors, such as associated with a particular physical asset or multiple physical assets, may be performed. In either case, once a sensor is registered (and has an API token), that sensor is authorized to communicate sensor data to the asset system 120.

In some embodiments, a sensor registration process includes providing of a list of sensors to the API registry 302. The API registry 302 may then coordinate a registration process with the sensor and, if the sensor is successfully registered, the API registry 302 associates a unique API token with the sensor and provides the API token to the sensor for future communications with the asset system 120. For example, the API token may be used to make RESTful calls to the event log filter 122 of the asset system 120.

This registration process may occur in various manners, such as through an automated discovery process that is initiated by a sensor when it is first powered on, e.g., the sensor attempts to communicate with available asset sensors via available network communication channels. In some embodiments, a separate communication device (e.g., using cellular, WIFI, or other wireless or wired communication protocol) may be attached to a physical asset that does not already have the appropriate communication hardware. This, the communication device may receive sensor data from the sensor and act as an intermediary with the asset system 120, including transmitting data to the API registry 302 to register the sensor.

In some embodiments, a user device (e.g., a smart phone, tablet, or other computing device) may connect directly to each sensor to provide information allowing the sensor to connect with the API registry 302 to receive its corresponding API token. In some embodiments, authentication information may be required to receive an API token from the API registry 302. In some embodiments, a user interface associated with the data management system 150 allows a user to indicate when a new sensor is added to an asset and identify a particular type of the sensors, and/or additional information regarding the sensor and/or assets, to initiate selection of event filters for that sensor and/or registration of the sensor with the API registry 302.

Once the sensors have API tokens defining how sensor output data should be provided to the asset system 120, the sensors may begin to deliver sensor data via the API channel created using the API token. For example, in the embodiment of FIG. 3, a sensor may transmit sensor data, along with the API token, to the authorization filter 306, which identifies the sensor that transmitted the sensor data and confirms authorization of the sensor to provide such data to the asset system 120. The authorization filter 306 determines whether the API token is a registered token, such as being included in the relation data store 308 with an indication that the token has been registered and is associated with a particular sensor.

In the embodiment of FIG. 3, a relation data store 308 stores associations between particular sensors and event filters. For example, a certain type of sensor (e.g., a temperate sensor for a particular piece of equipment) may be associated with an event filter that triggers an event when the temperature output from the sensor is above a certain temperature for a certain time period. In some embodiments, event filters for a sensor may be initially selected based on characteristics associated with the sensor. Thus, a large quantity of sensors may be easily associated with event filters by identifying default event filters corresponding with the particular sensor characteristics. In some embodiments, an operator of the data management system 150 may establish default event filters for particular sensors or groups of sensors. In this example, for each sensor of type A that is added to an asset associated with the data management system 150, a predefined event filter(s) are associated with the type A sensor in the relation data store 308. Event settings may be customized for each sensor also, such as a particular temperature sensor associated with a truck having an event trigger at a first temperature and the same temperature sensor associated with an airplane having an event trigger at a second (much higher or much lower) temperature.

The event filter 122 may then analyze each sensor data (or group of sensor data from one or more sensors) and apply corresponding event filters to determine filter data that should be provided to the data management system 150 and/or further analyzed to determine risk metrics, for example. Advantageously, only a very limited set of the sensor data transmitted from the sensors 112A-112H may be provided to the data management system 150, such that the data management system 150 is not overburdened with massive data associated with uninteresting sensor activity e.g., sensor outputs indicating that an asset is operating within an optimal range. Additionally, through use of the intermediate asset system 120 to gather sensor data from the authenticated sensors and filter such sensor data according to event filters, provision of the filtered event data to the data management system 150 may be limited to a single (or very few) secure channels through a firewall associated with the data management system 150. This is an improvement over previous systems wherein a separate channel through a firewall may be established for each sensor that is providing data into the firewalled system.

Thus, the asset system may store, analyze, apply rules and models, etc. to sensor data from each of a plurality of assets and thereafter provide event data (e.g., some small subset of sensor data that matches event rules) to a data management system, such as may be operated by an entity owning or having some other interest in status of the various assets.

Example Methods

Figure 4:
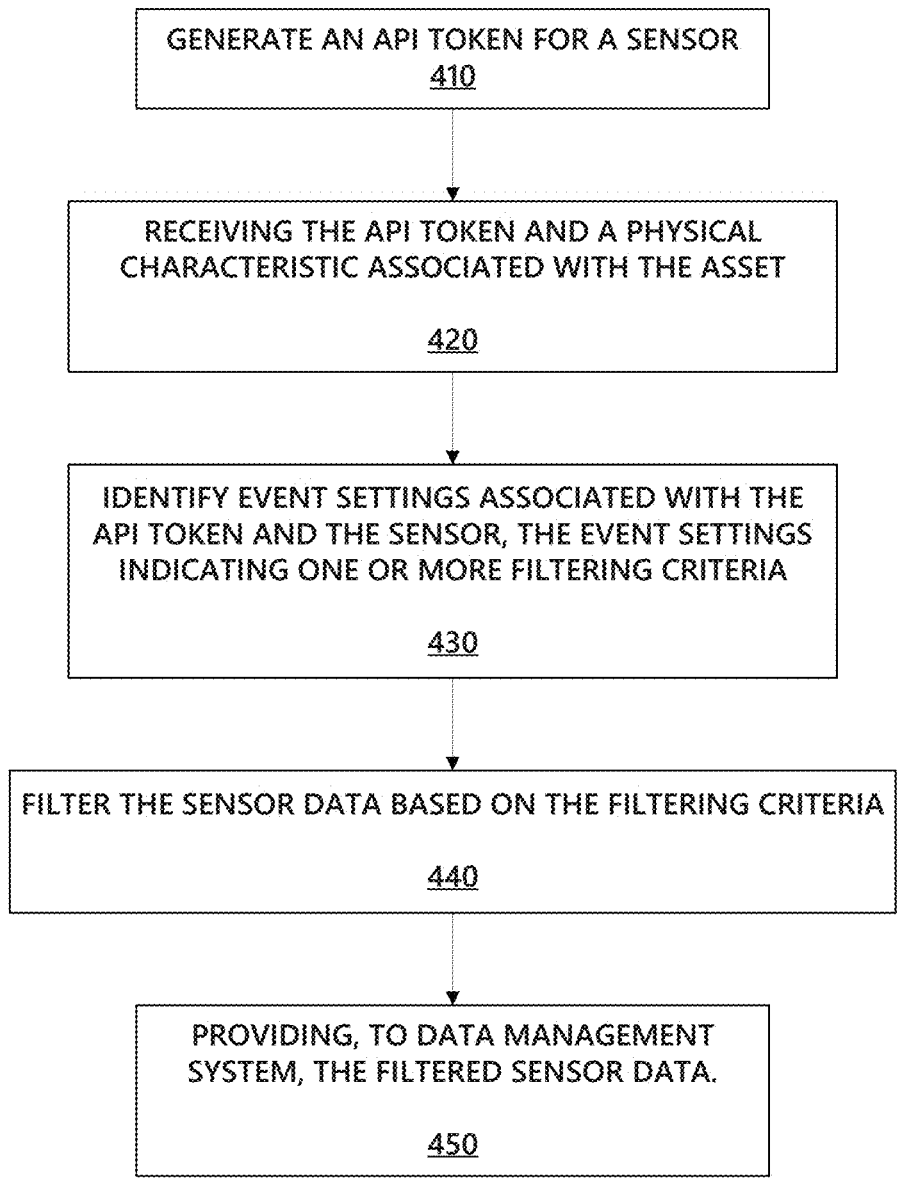
FIG. 4 is a flowchart illustrating one embodiment of a method of receiving, analyzing, storing, and/or filtering sensor data.

FIG. 4 is a flowchart illustrating one embodiment of a method of receiving, analyzing, storing, and/or filtering sensor data. In one embodiment, the method of FIG. 4 may be performed by an asset system 200, such as discussed herein. In other embodiments, certain of the blocks of FIG. 4 may be performed by fewer and/or additional components, systems, and/or entities. Additionally, the method of FIG. 4 may include further and/or fewer blocks than is illustrated and the blocks may be performed in order different than illustrated.

Beginning in block 410, a unique API token for a sensor is generated, such as by the API registry 302 (of the asset system 120) or data management system 150. As discussed elsewhere herein, each physical asset 110A-110C is assigned an API token so that it can uniquely identify itself to the asset system 120. Each transmission of sensor data should then have either the API token, or a session token (or similar identification data) in certain implementations. Through use of such unique identifying tokens, the asset system 120 can accurately identify the particular sensor that is transmitting sensor data.

In one embodiment, the asset system 120 generates the API tokens, stores the API tokens, and provides them to the corresponding physical assets. In another embodiment, API tokens are generated by the data management system 150 and then provided to the asset system 120 to register the API tokens as a valid token. Once the API tokes are registered with the asset system 120, the asset system 120 may then provide these tokens with the corresponding physical assets. In other embodiments, other devices and/or components may perform portions of the API generation, storage, and/or provisioning of the API tokens.

Next, in block 420, the asset system (e.g., asset system 120) receives sensor data from registered sensors indicating physical characteristics associated with an asset. The sensor data is transmitted using the API token associated with the sensor, which indicates authorization for the sensor to provide sensor data to the asset system, and allows the asset system to properly identify event filters relevant to the sensor data.

Next, at block 430, the asset system identifies event settings associated with the API token, and thus with the sensor. As noted above, event settings may be associated with a sensor, and its corresponding assigned API token, upon registration of the sensor. Additionally, event settings may be updated for any particular sensor, sensor type, asset, etc. at any time by the operator of the data management system 150.

Moving to block 440, the sensor data is then filtered based on the identified filtering criteria (e.g., associated with the received API token and identified filtering criteria using the relation data store 308). In some embodiments, sensor data from multiple sensors is considered by filtering criteria. For example, filtering criteria for a particular asset may indicate that sensor data from first time series data associated with the asset is within a first predefined range, while second time series data from a second sensor associated with the asset is within a second predefined range. Thus, the event filter may not only filter a timeseries data stream from a particular sensor according to predefined filtering criteria, but may also apply higher level rules, criteria, models, to sensor data from multiple sensors in identifying events of potential interest, such as events that may indicate imminent or ongoing damage or misoperation of an associated physical asset. Similarly, the asset system 120 (and/or other device) may apply such multi-sensor rules to the filtered data stored in the time series data store 124.

In block 450, the filtered sensor data is provided to the data management system. Advantageously, the asset system is able to provide relevant asset data to the data management system via a limited quantity (e.g., one) pathway through the data management systems firewall, greatly enhancing security of the data management system over other prior implementations where each sensor may require a separate pathway through the firewall.

Figure 5:
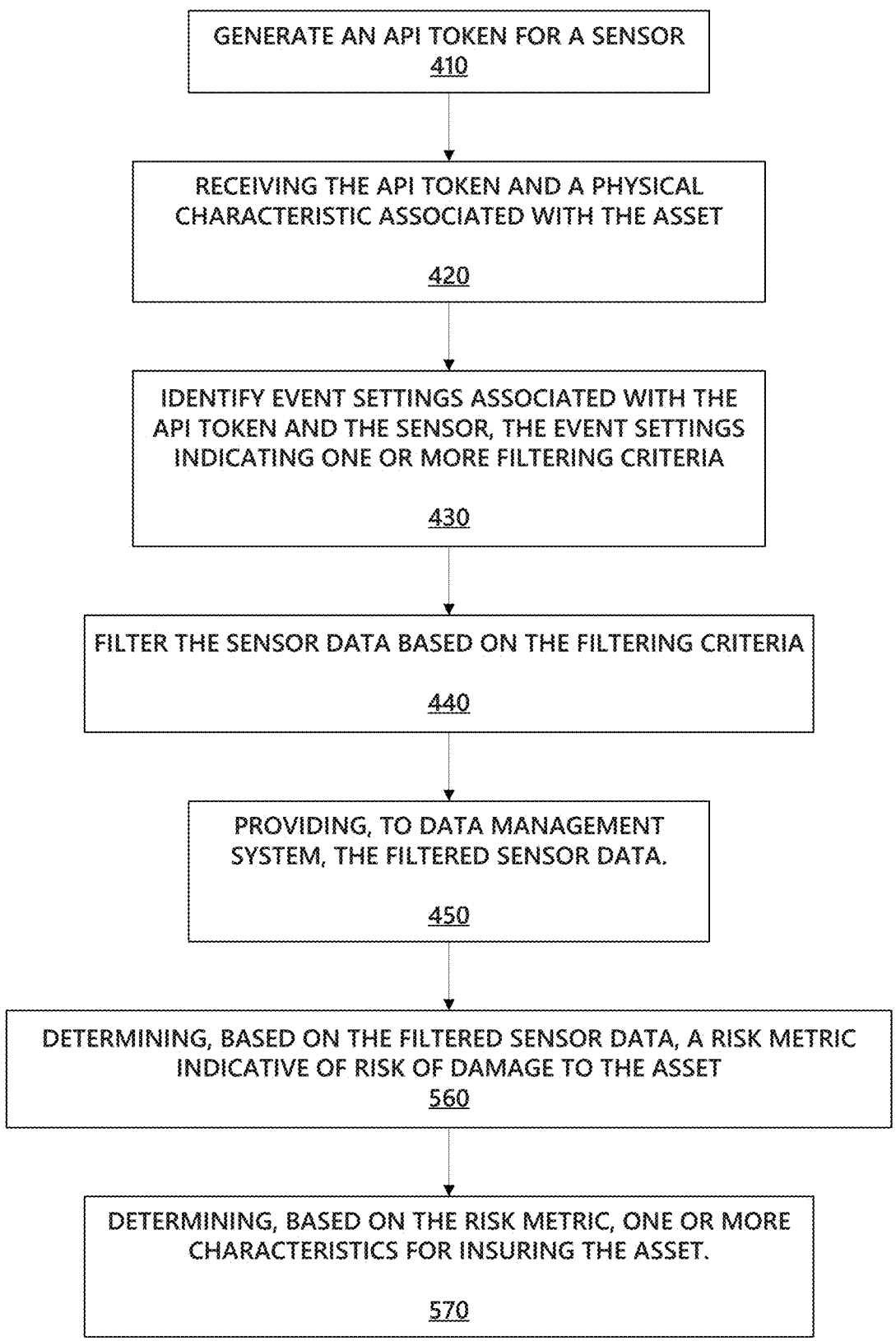
FIG. 5 is a flowchart illustrating another embodiment of a method of receiving, analyzing, storing, and/or filtering sensor data, as well as determining a risk indicator and/or metric for insuring the asset.

FIG. 5 is a flowchart illustrating another embodiment of a method of receiving, analyzing, storing, and/or filtering sensor data, as well as determining a risk indicator and/or metric for insuring the asset. In the example of FIG. 5, the method begins with blocks 410-450 that are performed in substantially the same manner as discussed above with reference to FIG. 4. In the example of FIG. 5, however, block 560 then continues to determine, based on filtered sensor data, a risk metric indicative of risk of damage to an asset. For example, the filtered sensor data from one or more sensors associated with an asset may be analyzed according to one or more rule sets, models, scoring algorithms, etc., to determine a risk of damage or misuse of the asset.

Furthermore, in block 570 of FIG. 5, the system may determine, based on the risk metric of block 560, one or more characteristics for insuring the asset, such as a dollar value of insurance that may be available for reducing cost associated with expected upcoming repairs to the physical asset. Similarly, the asset system could calculate an expected amount of damage (e.g., a dollar value) and an expected date of damage to the asset based on analysis of filtered sensor data, which may then be used as inputs to a scoring or pricing model. In other embodiments, other risk characteristics, scores, factors, may be determined based on the various streams of filtered input data.

Alerts and Notification

In some embodiments, the asset system 120 and/or data management system 150 provide alerts and/or other notifications to entities having an interest in the assets. For example, an alert may provide a real-time notice to an asset owner of an accident with reference to a particular asset, such as based on real-time data received from sensors associated with the particular asset. Thus, an asset owner could receive an alert indicating that a particular asset is about to fail (e.g., sensor data from multiple sensors associated with a vehicle may indicate that the vehicle is at a high risk of a breakdown) so that preventative action may be taken.

In some embodiments, alerts may be automatically transmitted to the device operated by the entity associated with the alert and/or notification. The alert and/or notification can be transmitted at the time that the alert and/or notification is generated or at some determined time after generation of the alert and/or notification. When received by the device, the alert and/or notification can cause the device to display the alert and/or notification via the activation of an application on the device (e.g., a browser, a mobile application, etc.). For example, receipt of the alert and/or notification may automatically activate an application on the device, such as a messaging application (e.g., SMS or MMS messaging application), a standalone application (e.g., a data analysis application), or a browser, for example, and display information included in the alert and/or notification. If the device is offline when the alert and/or notification is transmitted, the application may be automatically activated when the device is online such that the alert and/or notification is displayed. As another example, receipt of the alert and/or notification may cause a browser to open and be redirected to a login page so that the entity can log and view the alert and/or notification. Alternatively, the alert and/or notification may include a URL of a webpage (or other online information) associated with the alert and/or notification, such that when the device (e.g., a mobile device) receives the alert, a browser (or other application) is automatically activated and the URL included in the alert and/or notification is accessed via the Internet.

Example Computing System Architecture and Operation

Figure 6:
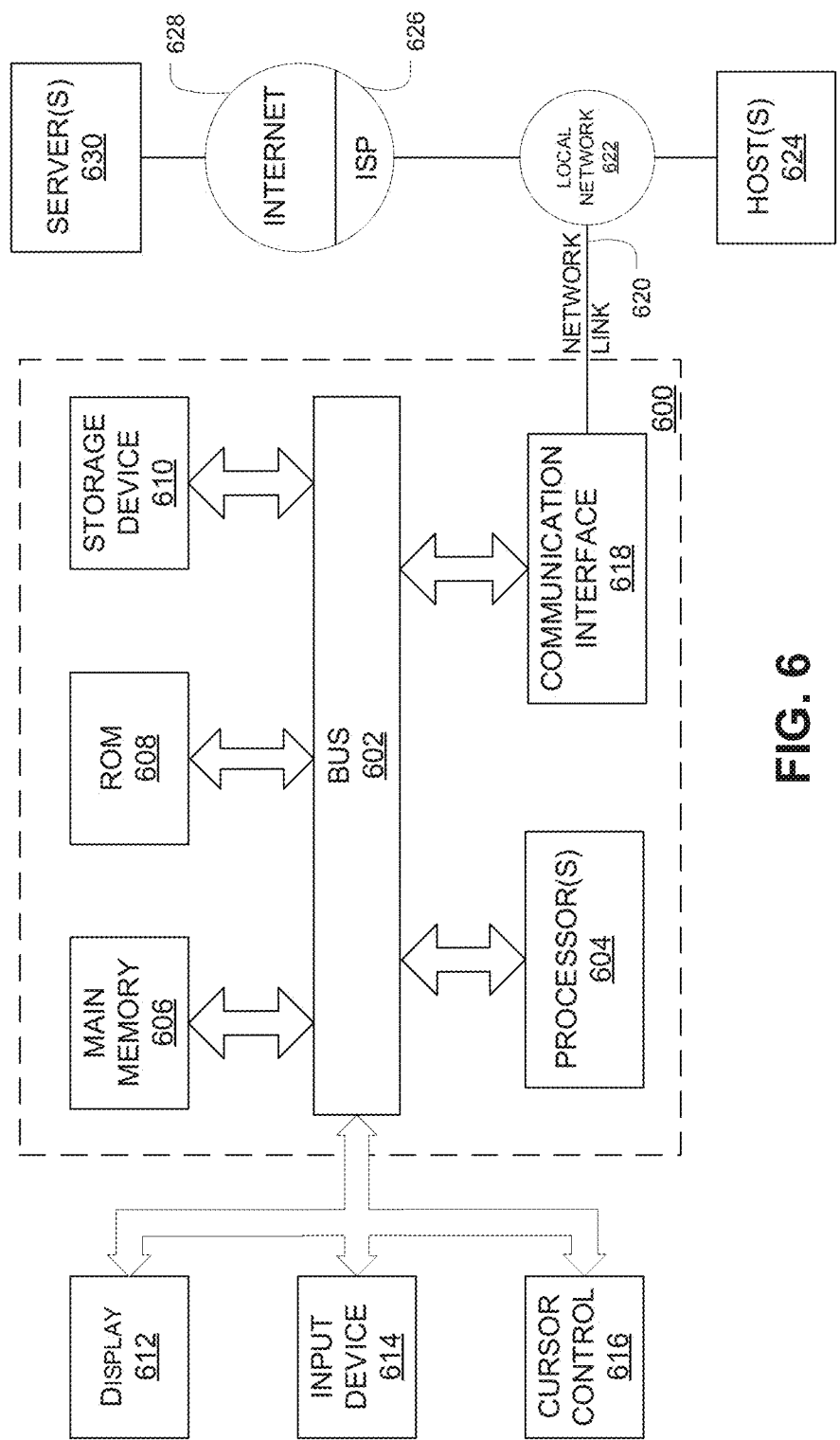
FIG. 6 illustrates a computer system with which certain methods discussed herein may be implemented.

FIG. 6 illustrates a computer system with which certain methods discussed herein may be implemented. For example, the asset system 120 and/or the data management system 150 may include some, all, or additional components as discussed below with reference to system 600.

Computer system 600 includes a bus 602 or other communication mechanism for communicating information, and a hardware processor, or multiple processors, 604 coupled with bus 602 for processing information. Hardware processor(s) 604 may be, for example, one or more general purpose microprocessors.

Computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

Computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 600 may include a user interface module to implement a GUI that may be stored in a mass storage device as computer executable program instructions that are executed by the computing device(s). Computer system 600 may further, as described below, implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more computer readable program instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

Various forms of computer readable storage media may be involved in carrying one or more sequences of one or more computer readable program instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicate with a WAN). Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

ADDITIONAL IMPLEMENTATION DETAILS AND EMBODIMENTS

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as macOS®, iOS, Android™, Chrome OS™ Windows® OS (e.g., Windows® XP, Windows Vista™, Windows®7, Windows 8®, Windows®106, Windows® Server, etc.), Windows® CE, Unix®, Linux®, SunOS®, Solaris®, Blackberry® OS, VxWorks®, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method performed by an asset system, the method comprising:

receiving, from a first sensor associated with a first physical asset, a first wireless communication request;

determining a first type of the first sensor;

determining, based at least on the first type of the first sensor, a first filtering criteria indicating a first range of data values associated with performance of the first physical asset;

generating a first API token associated with the first sensor;

associating, in an API registry, the first API token with the first filtering criteria;

transmitting the first API token to the first sensor, wherein the first API token allows the first sensor to transmit first sensor data associated with the first physical asset to the asset system;

receiving, from a second sensor associated with a second physical asset, a second wireless communication request;

determining a second type of the second sensor, wherein the second type is different from the first type;

determining, based at least on the second type of the second sensor, a second filtering criteria indicating a second range of data values associated with performance of the second physical asset, wherein the second range is different from the first range;

generating a second API token associated with the second sensor;

associating, in the API registry, the second API token with the second filtering criteria;

transmitting the second API token to the second sensor, wherein the second API token allows the second sensor to transmit second sensor data associated with the second physical asset to the asset system;
receiving a first sensor data including the first API token and first time-series data indicating one or more sensor values from the first sensor;
identifying, using the API registry, the first filtering criteria associated with the first API token;
filtering the first sensor data based on the identified first filtering criteria to determine a portion of the first sensor data, wherein the portion of the first sensor data is first event data;
receiving a second sensor data including the second API token and second time-series data indicating one or more sensor values from the second sensor;
identifying, using the API registry, the second filtering criteria associated with the second API token;
filtering the second sensor data based on the identified second filtering criteria to determine a portion of the second sensor data, wherein the portion of the second sensor data is second event data;
providing, via a communication channel configured to communicate with a data management system, filtered sensor data comprising at least the first event data and the second event data, wherein the data management system comprises a firewall that accepts communications from the asset system and does not accept communications directly from the first sensor or the second sensor;
providing a user interface displaying:
a user interface element configured to receive input indicating adjustments to the first filtering criteria to be associated with the first sensor;
a real-time view of status of assets, including at least risk information associated with the assets, the risk determined by analyzing the filtered sensor data for each asset by:
determining based at least on the filtered sensor data, a risk of misuse of each asset; and
determining, based at least on the determined risk, an expected amount of damage to each asset.

2. The method of claim 1,
wherein the user interface is further configured to receive input indicating adjustments to the first filtering criteria to be associated with the first sensor data.

3. The method of claim 1, wherein an event setting is associated with sensor data from a plurality of sensors associated with an asset.

4. The method of claim 3, wherein the event setting indicates a first threshold associated with a first of the plurality of sensors associated with the asset and a second threshold, different than the first threshold, associated with a second of the plurality of sensors associated with the asset.

5. The method of claim 1, further comprising:
determining, based on the first event data, a risk metric indicative of risk of damage to the first physical asset; and
determining, based on the risk metric, one or more preventative actions to minimize damage to the first physical asset.

6. The method of claim 5, wherein one or more of the risk metric and the one or more preventative actions are automatically transmitted to a computing device of a user associated with the first physical asset in response to determining that the risk metric exceeds a threshold.

7. The method of claim 1, wherein the first and second filtered sensor data associated with the first and second API tokens and first and second sensors, respectively, is received at the data management system via a single firewall access port of the firewall.

8. The method of claim 1, wherein the asset system is positioned at a work site.

9. The method of claim 1, wherein the first asset is an automobile asset, and the second asset is a computing device.

10. The method of claim 9, wherein the automobile asset includes a communication device configured to receive sensor data from the plurality of sensors and transmit the received sensor data to the asset system.

11. The method of claim 9, further comprising:
determining, based on the first event data, a risk metric indicative of risk of a breakdown of the automobile asset; and
determining, based on the risk metric, one or more preventative actions to minimize damage to the automobile asset.

12. An asset system comprising:
a storage medium storing software code;
a computer processor configured to access the stored software code to cause the asset system to:
receive, from a first sensor associated with a first physical asset, a first wireless communication request;
determine a first type of the first sensor;
determine, based at least on the first type of the first sensor, a first filtering criteria indicating a first range of data values associated with performance of the first physical asset;
generate a first API token associated with the first sensor;
associate, in an API registry, the first API token with the first filtering criteria;
transmit the first API token to the first sensor, wherein the first API token allows the first sensor to transmit first sensor data associated with the first physical asset to the asset system;
receive a first sensor data including the first API token and a physical characteristic associated with the asset, the physical characteristic comprising one or more sensor values from the first sensor;
identify, using the API registry, the first filtering criteria associated with the first API token;
filter the first sensor data based on the identified first filtering criteria to determine a portion of the sensor data, wherein the portion of the sensor data is first event data;
provide, via a communication channel configured to communicate with a remote data management system, the filtered first sensor data associated with each of a plurality of API tokens, wherein the data management system comprises a firewall that accepts communications from the asset system and does not accept communications directly from the first sensor or the second sensor; and
provide a user interface displaying:
a user interface element configured to receive input indicating adjustments to the first filtering criteria to be associated with the first sensor;
a real-time view of status of assets, including at least risk information associated with the assets, the risk determined by analyzing the filtered sensor data for each asset by:

determining based at least on the filtered sensor data, a risk of misuse of each asset; and determining, based at least on the determined risk, an expected amount of damage to each asset.

13. The asset system of claim 12, wherein the software code is further configured to cause the asset system to:

receive authorization information associated with an entity having an interest in status of the first physical asset; and store an association between the first API token and the first sensor.

14. The asset system of claim 12, wherein the software code is further configured to cause the asset system to:

based at least on the first type of the first sensor, select one or more event settings to be associated with the first sensor; and store an association between the first API token and the selected event settings.

15. The asset system of claim 14, wherein the software code is further configured to cause the asset system to:

receive, at the user interface, input indicating adjustments to the selected event settings or one or more additional event settings to be associated with the first sensor.

16. The asset system of claim 12, wherein an event setting is associated with sensor data from a plurality of sensors associated with an asset.

17. The asset system of claim 16, wherein the event settings indicate a first threshold associated with a first of the plurality of sensors associated with the asset and a second threshold, different than the first threshold, associated with a second of the plurality of sensors associated with the assets.

18. The asset system of claim 12, wherein the physical asset comprises one or more of a physical object, vehicle, automobile, airplane, boat, airport, hospital, factory, machinery, person, computer, or phone.

19. The asset system of claim 12, wherein the software code is further configured to cause the asset system to:

determine, based on the filtered first sensor data, a risk metric indicative of risk of damage to the first asset; and determine, based on the risk metric, one or more characteristics for insuring the first asset.

20. The asset system of claim 12, wherein the software code is further configured to cause the asset system to:

determine, based on the first filtered sensor data, a risk metric indicative of risk of damage to the first asset; and determine, based on the risk metric, one or more preventative actions to minimize damage to the first asset.

21. The asset system of claim 20, wherein one or more of the risk metric and the one or more preventative actions are automatically transmitted to a computing device of a user associated with the first asset in response to determining that the risk metric exceeds a threshold.

22. The asset system of claim 12, wherein the software code is further configured to cause the asset system to:

receive, from a second sensor associated with a second physical asset, a second wireless communication request;

determine a second type of the second sensor, wherein the second type is different from the first type;

determine, based at least on the second type of the second sensor, a second filtering criteria indicating a second range of data values associated with performance of the second physical asset, wherein the second range is different from the first range;

generate a second API token associated with the second sensor;

associate, in an API registry, the second API token with the second filtering criteria;

transmit the second API token to the second sensor, wherein the second API token allows the second sensor to transmit second sensor data associated with the second physical asset to the asset system;

determine, based on the filtered first sensor data, a risk metric indicative of risk of damage to the first asset; and determine, based on the risk metric, one or more characteristics for insuring the first asset.

\* \* \* \* \*